United States Patent [19]
Prather et al.

[11] Patent Number: 6,054,923
[45] Date of Patent: Apr. 25, 2000

[54] SHOPPING CART WITH THEFT DISABLING DEVICE

[75] Inventors: James G. Prather, Yorba Linda; Patrick Maandag, Corona; Harold Duffy, Inyokern, all of Calif.

[73] Assignee: Mind Quirx, LLC, Yorba Linda, Calif.

[21] Appl. No.: 09/083,476

[22] Filed: May 22, 1998

Related U.S. Application Data

[60] Provisional application No. 60/047,417, May 22, 1997.

[51] Int. Cl.⁷ .................................................. G08B 13/14
[52] U.S. Cl. ........................ 340/568.5; 188/1.12; 188/19; 280/33.994
[58] Field of Search ................................ 340/568.5, 539, 340/571; 188/1.12, 111, 19; 280/33.994, 33.993, 33.992

[56] References Cited

U.S. PATENT DOCUMENTS

| | | |
|---|---|---|
| 3,717,225 | 2/1973 | Rashbaum et al. ...................... 188/1.12 |
| 3,751,758 | 8/1973 | Higbee et al. .......................... 188/1.12 |
| 4,242,668 | 12/1980 | Herzog . |
| 4,524,985 | 6/1985 | Drake . |
| 4,577,880 | 3/1986 | Bianco . |
| 4,591,175 | 5/1986 | Upton et al. . |
| 4,772,880 | 9/1988 | Goldstein et al. . |
| 4,976,447 | 12/1990 | Batson ............................... 280/33.994 |
| 5,194,844 | 3/1993 | Zelda . |
| 5,315,290 | 5/1994 | Moreno et al. . |
| 5,357,182 | 10/1994 | Wolfe et al. . |
| 5,576,691 | 11/1996 | Coakley et al. . |
| 5,630,600 | 5/1997 | Pasillas ............................... 280/33.994 |
| 5,664,645 | 9/1997 | Rodriguez ............................ 188/1.12 |
| 5,669,100 | 9/1997 | Carpenter ........................... 280/33.994 |
| 5,823,302 | 10/1998 | Schweninger .......................... 188/1.12 |

*Primary Examiner*—Nina Tong
*Attorney, Agent, or Firm*—Terrell P. Lewis

[57] ABSTRACT

An anti-theft shopping cart with a collapsible front suspension that is triggered by a magnetic field or an audio frequency.

20 Claims, 7 Drawing Sheets

SHOPPING CART WITH THEFT DISABLING DEVICE

This application claims benefit of Provisional Application No. 60/047,417 filed May 22, 1997.

BACKGROUND OF THE INVENTION

1. Field of the Invention

This invention relates to anti theft shopping cart to prevent the loss of shopping carts from shopping stores. The device disables the front wheels, and the use of simple, inexpensive metal protrusions prevents the cart from being tilted, or pushed off the parking lot once the wheels disable.

2. Description of Related Art

Grocery stores and markets commonly supply consumers with shopping carts for holding and carrying merchandise in and out of the stores. In order to form an understanding of the invention, it is to be noted that shopping carts have a wheel supporting frame which supports a basket, and are utilized around the world at supermarkets and stores.

Generally, once a shopping cart is emptied by the customer, the customer rolls the cart to the side of their car and drives away. Thereafter an employee collects the discarded shopping cart and rolls it back to the market.

During the course of evaluating this invention it has been found that large numbers of customers roll the carts off the premises of the shopping center, never to be returned to the market. In addition, to customers who remove the shopping carts from the shopping center, children remove the carts for use as toys, the carts are also stolen by organized groups who then resell the stolen carts to the stores.

Shopping carts are relatively expensive, costing from $30 to $50 each. The theft of a certain percentage of carts from markets causes markets to keep excess shopping carts on hand in order to insure an adequate number of carts for the customers of these markets and stores.

Obviously, if a theft proof shopping cart could be developed at a reasonable cost, losses incurred from the loss of shopping carts could be reduced, and the money saved could be passed on to the consumer in the form of lower merchandise costs.

In response to the obvious need for a theft proof cart, several inventors have created several types of anti-theft devices for shopping carts. U.S. Pat. No. 3,717,225 to Rashbaum (1973) discloses a piston rod and wheel lock device. This device includes a frame mounted actuator that locks one of the wheels of the cart. It does not eliminate the potential for the use of one bank of cart wheels rotating by lifting the disabled wheel from the contact with the ground. U.S. Pat. No. 5,315,290 to Moreno (1994) discloses an electronic wheel lock device. This device also fails to eliminate the possibility of leaning the cart to the side of the still active wheels.

U.S. Pat. No. 4,242,668 to Herzog (1980) discloses a collapsible sub frame causing the wheels to swing out of operative position. This device immobilizes the front wheels of the cart, but does not eliminant the possibility the cart can be leaned back, and rolled away using the rear wheels of the cart. U.S. Pat. No. 5,357,182 (1994) discloses a braked wheel device. This device also fails to eliminate the possibility of leaning the cart to the side of the still active wheels once the cart has left the boundary of the parking lot.

U.S. Pat. No. 4,524,985 (1985) discloses an arrest device for a wheeled cart. This device relies on a hooking device in the parking lot, but does not appear to eliminate the possibility that the cart could be leaned to avoid the hooking device. U.S. Pat. No. 5,576,691 (1996) discloses another form of a wheel locking device. This device also fails to eliminate the removal of the cart by simply tipping the cart on to the back wheels and rolling the cart away.

U.S. Pat. No. 4,577,880 to Bianco (1986) discloses still another form of a wheel locking device. This device also fails to eliminate the removal of the cart by simply tipping the cart on to the back wheels and rolling the cart away. U.S. Pat. No. 4,772,880 to Goldstein (1988) discloses another form of wheel locking device, disabling only one of the front wheels.

U.S. Pat. No. 5,194,844 to Zelda (1993) discloses a proximity wheel locking mechanism. This device also fails to eliminate the removal of the cart by simply tipping the cart on to the back wheels and rolling the cart away. U.S. Pat. No. 4,591,175 to Upton (1986) discloses a magnetic wheel locking mechanism. This device also fails to eliminate the removal of the cart by simply tipping the cart on to the back wheels and rolling the cart away.

The wheel locking devices of the prior art used as identified work to disable only one wheel of the shopping cart. Since the shopping cart consists of four wheels, the disabling of one wheel would be insufficient to completely immobilize the cart. Several stores have discovered even if one wheel is disabled the person removing the cart will continue to push the cart with sufficient force to override the traction of the locked wheel.

The Herzon device disables the entire front wheel assembly by allowing the sub frames of the cart to collapse around the front wheel. This device does not eliminate the possibility of leaning the cart back and rolling it away on its rear wheels.

All of the devices heretofore known suffer from a number of disadvantages:

(a) The manufacture of small electronic devices inside a shopping wheel requires an extensive manufacturing process for the wheel hub. Such a facility, which is needed to install electronic sensors and locking mechanisms in a shopping cart wheel will result in longer manufacturing process, and increased manufacturing costs so as to make the shopping cart equipped with a wheel locking device prohibitively expensive.

(b) None of the devices heretofore known totally disable the cart. If one wheel is locked a person intent on removing the cart from the premises can exert enough force to overcome the friction of the locked wheel.

(c) None of the devices heretofore known can prevent all the wheels of the cart from being disabled, and to do so would be prohibitively expensive. If only one wheel is disabled, the cart can still be maneuvered by tilting the cart so that it can still be rolled away.

SUMMARY

Accordingly, several objects and advantages of the present invention are:

(a) to provide for a disabling device which can be produced simply without requiring the manufacturer to use a new facility to produce shopping carts;

(b) to provide a disabling device which allows for a convenient and extremely simple disabling device that would be easy to reset for an employee of the shopping market;

(c) to provide for a complete, all wheel disabling device;

(d) to provide a cart that could not be leaned to avoid the disabling device;

(e) to provide as much difficulty to a would be thief to remove the shopping cart the only way to remove the cart from the parking lot would be to physically carry the cart away;

(f) to provide a stop fixed on the non rotating rear caster which will stop forward movement when the front of the cart is elevated off the ground and becomes a pivot point making the cart go around in circles;

(g) to provide a stop fixed to the front of the frame of the cart that would prevent the cart from being pushed forward, the stop becomes a pivot point when the front wheels collapse causing the cart to go around in a circle;

(h) trigger release activated by a magnetic field or an audio frequency coming from an underground cable, when the horizontal release pins retract, the front suspension collapses, dropping the front part of the shopping cart to the ground in a stable, not precarious position, this stopping all forward movement;

(i) an antitheft device that permits the wheel position of the shopping cart to remain the as in the traditional shopping carts so as to maintain cart stability.

These and other objectives are accomplished in aspects of the invention, with a first aspect being a collapsible front suspension for use with a shopping cart comprising a support having two opposing sides with surfaces; a sensor comprising means for transmitting a trigger signal when a magnetic field or audio frequency is detected; two release pins moveably mounted to the support, the release pins comprising an outer end being extendable beyond the side surfaces, respectively; activation means for retracting the release pins upon receipt of the trigger signal such that the release pin outer ends are not extending beyond the respective side surfaces; and two linearly aligned hinge pins extending past the side surfaces, respectively. This aspect of the invention may further comprises a release pin movement assembly comprising a pivoting member rotatably mounted to the support; and rigid linking members extending from the pivoting member to an inner end of the release pins, respectively, the release pin movement assembly arranged such that rotating the pivoting member extends the release pins beyond the side surfaces, respectively, or retracts the release pins such that the release pins are retracted and not extending beyond the side surfaces, respectively. This aspect of the invention may further have the release pin movement assembly further comprising holding means for locking the pivoting member in a first position when a solenoid is extended such that the release pins extend beyond the side surfaces of the support; and the activation means comprising springs disposed about the release pins and between the linking member and the support sides such that the springs urge the release pins to retract when the solenoid is retracted, resulting in the pivoting member rotating to a second position; and a trigger wire comprising a metal that contracts when heated through electrical resistance from a battery. In a preferred aspect of the invention, the trigger wire is comprised of titanium nickel. In an further aspect of the invention, there are interlocking members extending from a top surface of the pivoting member, wherein the interlocking members are engagable with a rotating tool and capable of receiving an electric current therefrom; and conduit electrically connecting the interlocking members with the solenoid, whereby when the rotating tool has turned the pivoting member from the second position to the first position, the rotating tool is capable of sending an electrical current to the interlocking members, resulting in the solenoid extending and the pivoting member being locked in the first position by the holding means. This aspect of the invention may have two wheels mounted to an underside of the support.

In a further aspect of the invention, there are two mounting members, wherein each mounting member comprises a face that complements a respective support side surface, wherein a first hole extending through the face is alignable with a respective release pin when a respective hinge pin is extending into a second hole extending through the face; and a mounting leg extending from the face. The shopping cart comprises a U-shaped base frame having a front member and two side members extending therefrom; and the mounting members mounting legs are mounted to the side members, respectively such that the hinge pins extend into the respective second holes and the release pins are engageable with the respective first holes.

Other aspects of the invention have a stop forward movement dog extending from a base frame front member downwardly and away from the support. In preferred aspects of the invention, the stop forward movement dog is not centrally positioned on the base frame front member.

In another aspect of the invention, a shopping cart comprises a U-shaped base frame having a front member and two side members extending from the front member and terminating in first and second back ends; a first back wheel assembly non-rotatably mounted to the first back end comprising a first back wheel mounted in a stop rolling dog, the first back wheel assembly arranged such that the first back wheel is inhibited from rolling when the first back wheel and a bottom edge of the stop dog is in contact with a surface; and a second wheel assembly rotatably mounted to the second back end comprising a second wheel mounted in a wheel holder and a stop rotating dog extending from the shopping cart and comprising an end that prevents the wheel holder from rotating 360 degrees.

The immediate previous embodiment of the invention may further comprise a collapsible front suspension assembly comprising two opposing side surfaces of a support; sensor comprising means for transmitting a trigger signal when a magnetic field or audio frequency is detected; two release pins moveably mounted to the support, the release pins comprising an outer end being extendable beyond the side surfaces, respectively; activation means for retracting the release pins upon receipt of the trigger signal such that the release pin outer ends are retracted and not extending beyond the respective side surfaces; two linearly aligned hinge pins extending past the side surfaces, respectively; two front wheels mounted to an underside of the support; and two mounting members, wherein each mounting member comprises a face that complements a respective support side surface, wherein a first hole extending through the face is alignable with a respective release pin when a respective hinge pin is extending into a second hole extending through the face; and a mounting leg extending from the face, wherein the mounting members mounting legs are attached to the side members, respectively such that the hinge pins extend into the respective second holes and the release pins are engageable with the respective first holes.

In an additional aspect of the invention, a shopping cart may be retrofitted with an anti-theft device in a process comprising the steps of removing a front wheel assembly from a U-shaped base frame having a front member and two side members extending from the front member and terminating in first and second back ends; and providing a front suspension system comprising a collapsible front suspension assembly comprising two opposing side surfaces of a support; sensor comprising means for transmitting a trigger signal when a magnetic field or audio frequency is detected; two release pins moveably mounted to the support, the release pins comprising an outer end being extendable beyond the side surfaces, respectively; activation means for retracting the release pins upon receipt of the trigger signal such that the release pin outer ends are not extending beyond the respective side surfaces; two linearly aligned hinge pins extending past the side surfaces, respectively; two front wheels mounted to an underside of the support; and two mounting members, wherein each mounting member comprises a face that complements a respective support side surface, wherein a first hole extending through the face is alignable with a respective release pin when a respective hinge pin is extending into a second hole extending through the face; and a mounting leg extending from the face; and the remaining step of attaching the mounting members mounting legs to the side members, respectively, such that the hinge pins extend into the respective second holes and the release pins are engageable with the respective first holes.

In another aspect of the invention, a process of preventing shopping cart theft comprising the steps of providing the shopping cart with a disabling device such as those described above, and generating a magnetic field or an audio frequncy along a perimeter of an area.

In another aspect of the invention, a tool for extending release pins of a collapsible front suspension of a shopping cart comprises a first end that complements interlocking members of a pivoting member of the suspension, the first end comprising a first portion that is engageable with a first interlocking member and a second portion that is engagable with a second interlocking member, the first and second portions of the first end being electrically insulated from each other; a body extending from the first end; a power source in electrical communication with the first end; and a switch to direct electrical power to flow from the power source and to the first portion of the first end. In a further aspect of the invention, the tool body terminates at a handle at the second end; the switch is in the handle; and the source is in the body. Further, objects and advantages are to provide a shopping cart that can be used easily and conveniently without damage to the shopping cart, or injury to a person using the cart, which is simple to use and inexpensive to manufacture, which can be supplied en masse, and does not require exotic material or separate manufacturing facilities, which can be used repeatedly and is easy to maintain. Still further objects and advantages will become apparent from a consideration of the ensuing description and drawings.

DESCRIPTION OF THE PREFERRED EMBODIMENTS

Figure 1:
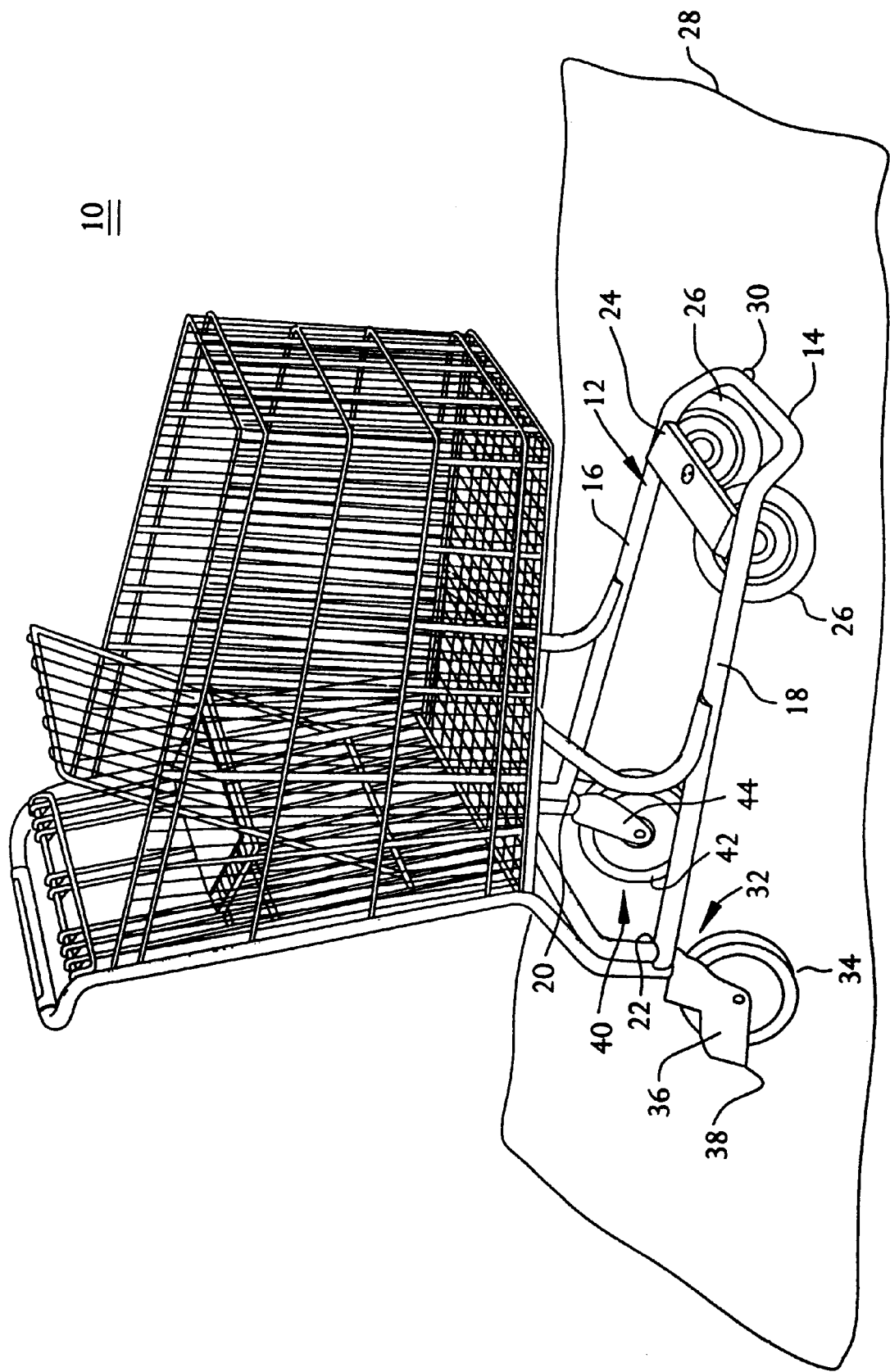
FIGS. 1–4 show an anti-theft shopping cart according to an embodiment of the invention.
Figure 2:
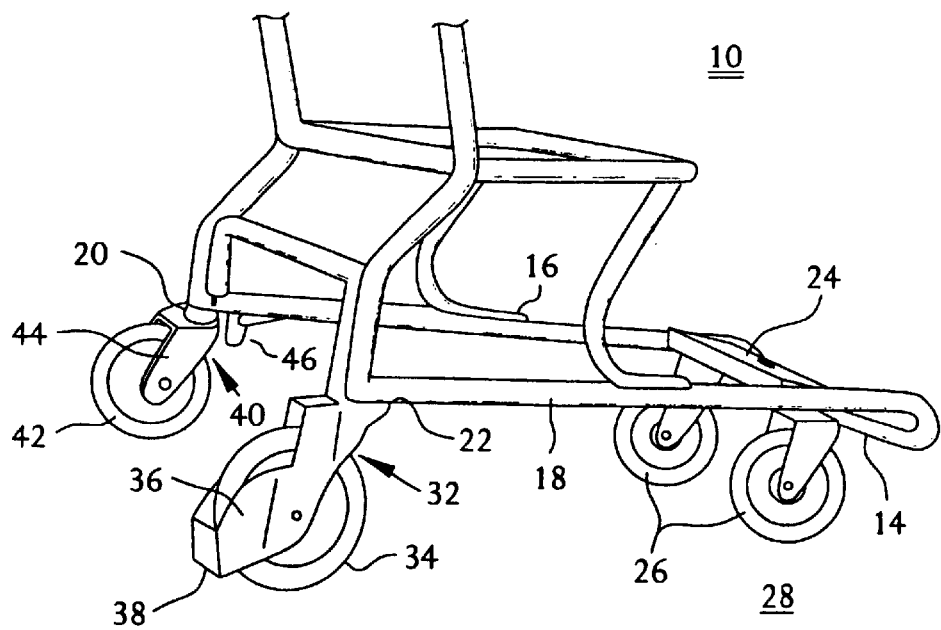

Now referring to the figures, wherein like reference numeral refer to like elements throughout the figures, and referring in particular to FIGS. 1 and 2, a shopping cart 10 has a U-shaped base frame 12 comprising a front member 14 and two side member 16 and 18 extending therefrom. The side members 16 and 18 have back ends 20 and 22, respectively.

A collapsible front suspension 24, which is shown in it's collapsed state in FIG. 1, extends between the two side members 16 and 18. FIG. 2, which shows the shows suspension 24 in its non-collapsed state. The details of the suspension 24 are describe below. Two front wheels 26 are mounted to the underside of the suspension 24. As shown in FIG. 1, when the suspension 24 is collapsed, the front member 14 is on the surface 28, inhibiting the shopping cart 10 from being pushed forward.

To further inhibit the shopping cart 10 from being pushed forward, a stop forward movement dog 30 extends from the front member 14 downwardly and away from the suspension 26. Shown in a preferred embodiment, the dog 30 is not centrally positioned on the front member 14, but rather is located off center. By locating the dog 30 off center, the shopping cart 10 will pivot about the dog if pushed forwardly. It pivots about the dog 30 because the dog digs into the surface 28. By pivoting about the dog 30, the shopping cart 10 cannot be pushed forward easily when the suspension 24 is in it's collapsed state, inhibited theft of the cart. Embodiments of the shopping cart 10 may have the dog 30 located anyway, or may not have the dog present. The dog 30 may be protrusion that digs into, bites into, or skids along the surface 28.

The shopping cart 10 has a first back wheel assembly 32 non-rotatably mounted to the back end 22 of the side member 18. By being non-rotatably mounted, the assembly 32 does not rotate in a plane that is parallel to the surface 28. The assembly 32 is comprised of a wheel 34 rotatably mounted to a stop rolling dog 36. The stop rolling dog 36 has a bottom edge 38 that contacts the surface 28 when the front member 14 of the cart 10 is tilted upwards. As the bottom edge 38 is in contact with the surface 28, the wheel 34 is inhibited from rolling. Other embodiments of the invention may have other suitable rolling stop dogs. Other embodiments of the invention may not have a rolling stop dog.

The shopping cart 10 has a second back wheel assembly 40 rotatably mounted to the back end 20 of the side member 16. By being rotatably mounted, the assembly 40 rotates in a plane that is parallel to the surface 28. The assembly comprises a wheel 42 rotatably mounted in a wheel holder 44. The assembly 40 further comprises a stop rotating dog 46 extending from the underside of the back end 20. The stop rotating dog 46 is positioned to prevent the wheel holder 44 from rotating 360 degrees. By preventing the wheel holder 44 from rotating 360 degrees, the shopping cart 10 cannot be easily pulled backwards, thus further inhibiting theft. Other embodiments of the invention may have the stop rotating dog mounted on the wheel assembly 40. Other embodiments of the invention may have a stop rotating dog 46 that descends upon the collapse of the front suspension system 24. Still flirter embodiments of the invention may not have a stop rotating dog 46. Still further embodiments of the invention may have the stop rolling dog 36 and the stop rotating dog 46 and not the collapsible front suspension 24.

Figure 3:
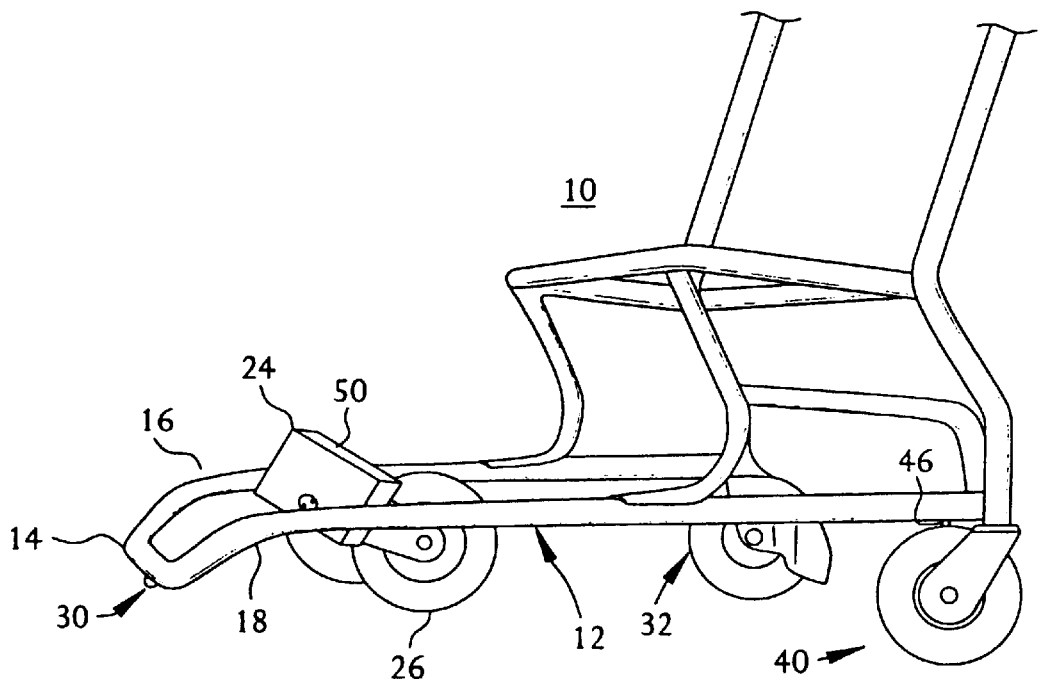
Figure 4:
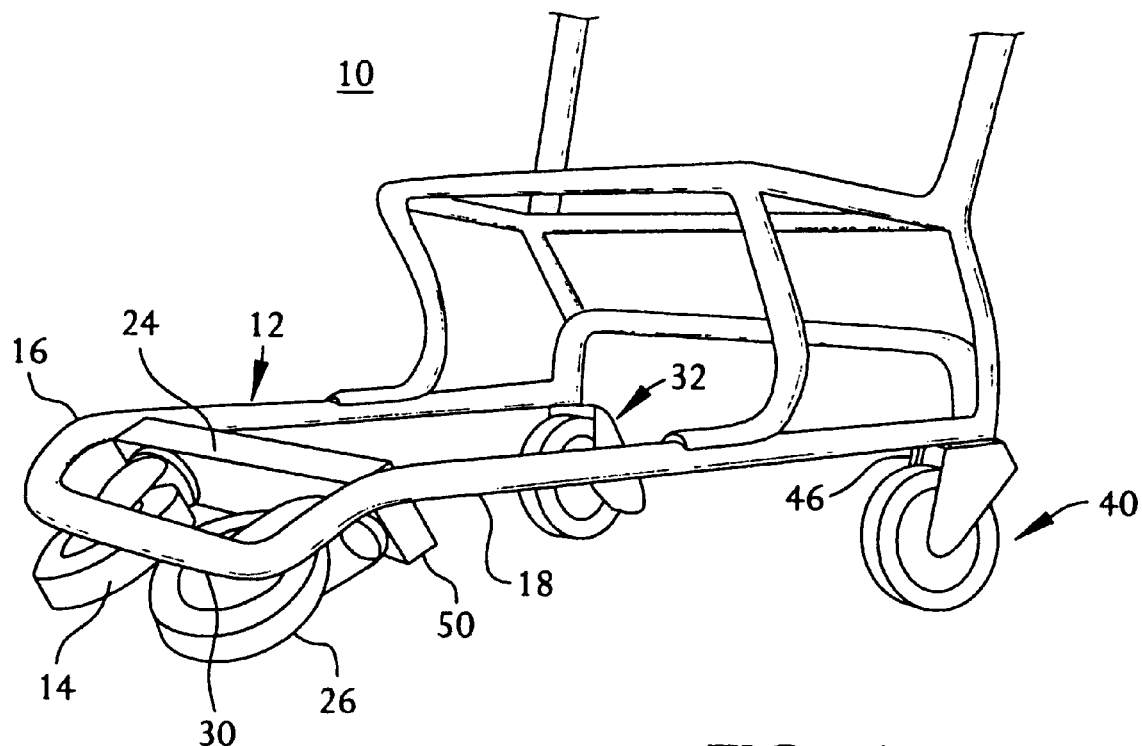

Referring now to FIG. 3, the collapsible front suspension 24 is shown in it's collapsed state from a different perspective. In FIG. 3, a suspension 24 has collapsed such that a back edge 50 of the suspension is above the U-shaped frame 12. Referring now to FIG. 4, the collapsible front suspension is shown in an alternative collapsed state with the back edge 50 below the U-shaped frame 12. The collapsed position shown in FIG. 3 occurs more frequently than the position in FIG. 4 of the shown embodiment due to the being pushed forwardly when the suspension 24 collapses.

Figure 5:
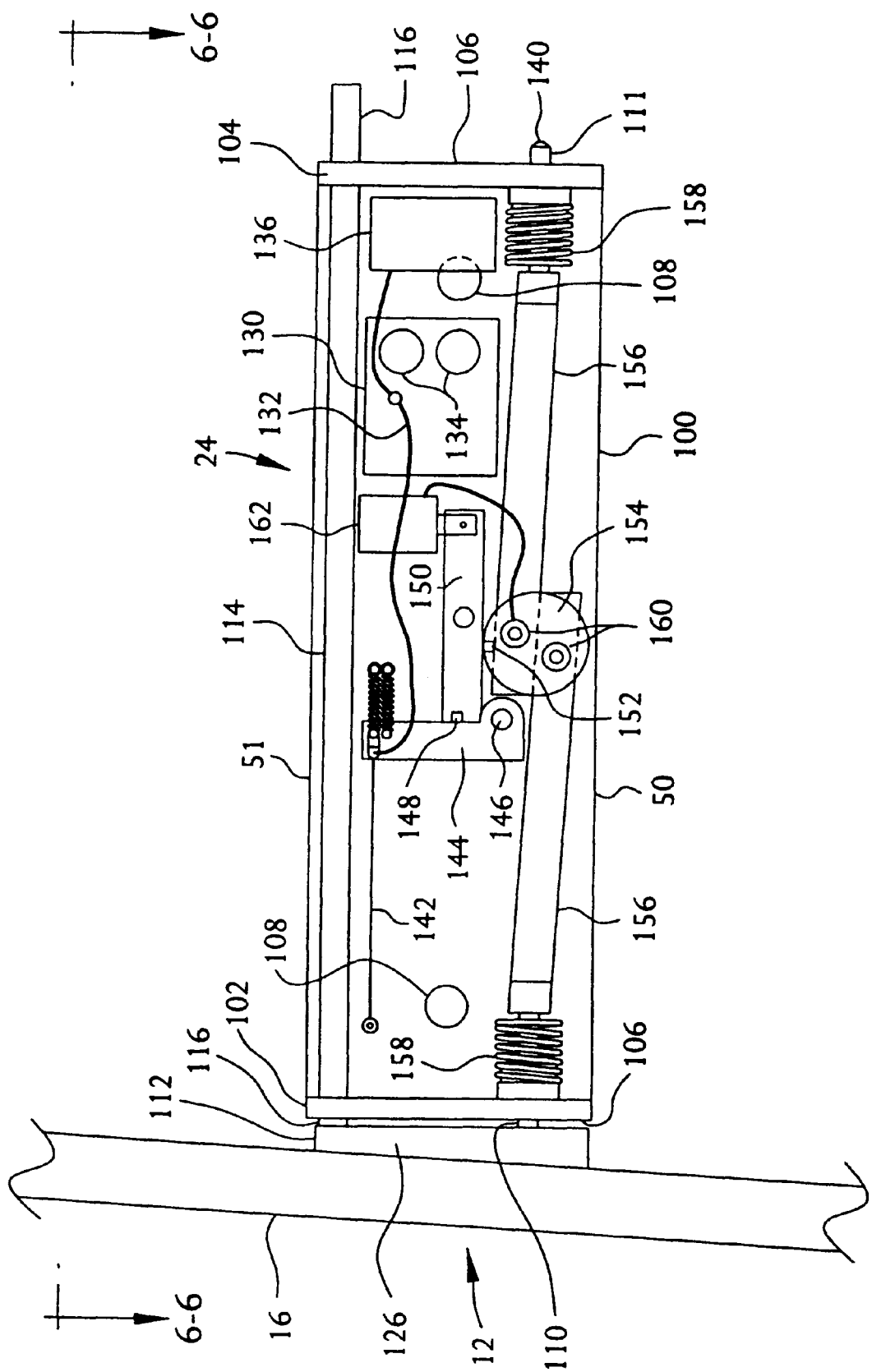
Figure 6:
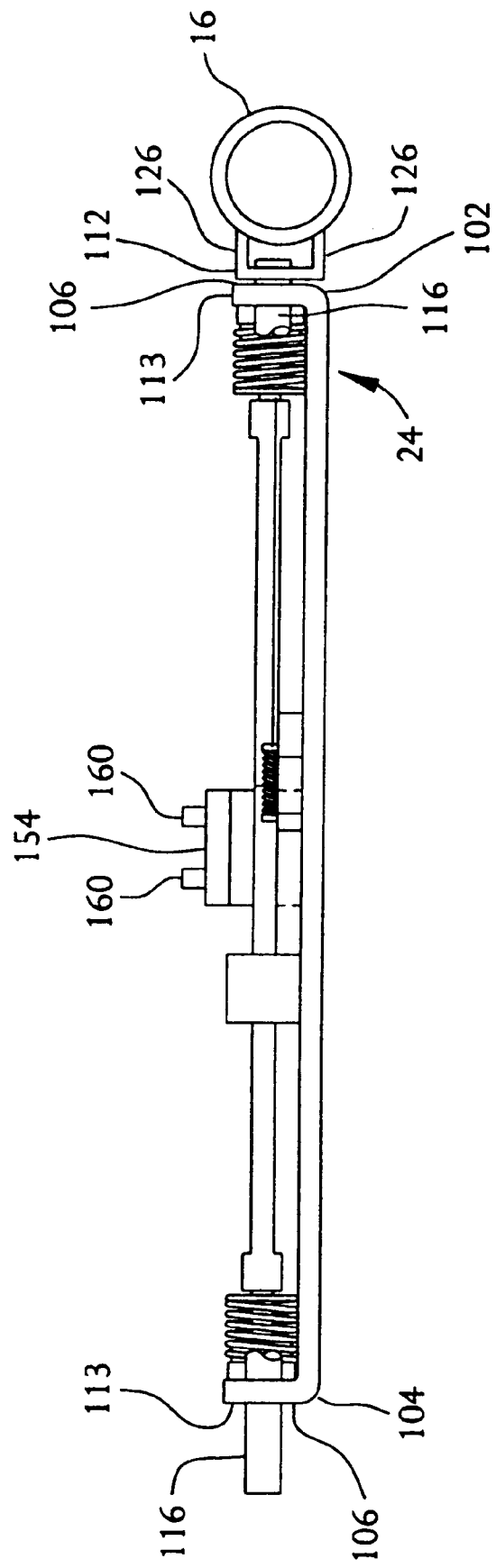

Referring now to FIGS. 5 and 6, details of the preferred embodiment of the collapsible front suspension 24 is shown. A cover of the suspension 24 is not shown to reveal its internal workings. The suspension 24 comprises a support 100 having two opposing sides 102 and 104 with exterior side surfaces 106. Two holes 108 extend through the support for attaching the front wheels 26 thereto.

The support 100 has a two release pins 110 and 112 shown extending beyond the surfaces 106 in the proximity of the back end 50. The support 100 also has a hinge rod 114 extending along a front edge 51 of the support. The hinge rod 114 has two pin ends 116 extending beyond the exterior side surfaces 106, the pin ends being linearly aligned. Other embodiments of the invention may have the two pin ends 116 not being part of a hinge rod, but entirely separate.

Figure 7:
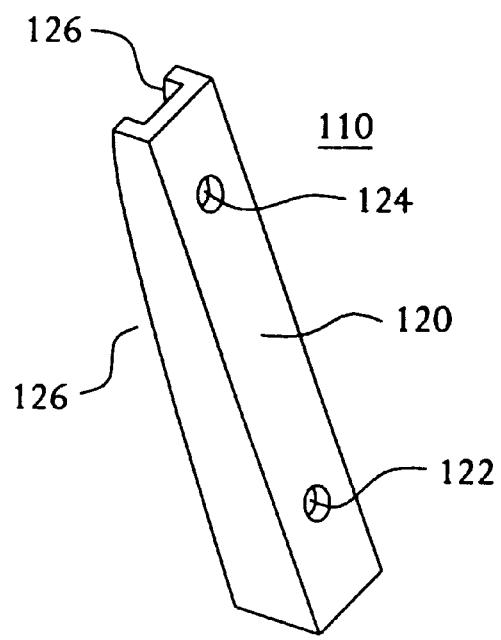
FIGS. 5–7 show details of the collapsible front suspension of the shopping cart shown in FIGS. 1–4.

A front edge of the support 100 is pivotly mounted to the u-shaped frame 12. More specifically, mounting members 110 are used to mount the support 100 to the frame 12. Referring now to FIG. 7, the mounting member 110 comprises a face 120 that complements the exterior side surface 106. The face 120 has a first hole 122 extending therethrough that is alignable with the respective release pins 110 and 112. The face 120 has a second hole 124 extending therethrough that is alignable with the respective pin ends 116. In the shown embodiment, the mounting member has two mounting legs 126 extending from the face 112 and are attached to the respective side member 16 and 18. The mounting member adapts the U-shaped frame 12 of the shopping cart 10 to the suspension 24. Other embodiments of the invention may have other configurations for adapting the suspension 24 to the shopping cart 10, or may not require adaption due to the configuration of the suspension and the cart.

A magnetic field sensor 130 is mounted on the support 100. The sensor transmits a trigger signal via conduit 132 when a magnetic field is detected. The triggering magnetic field is described below. In the preferred embodiment of the invention, the magnetic field is sensed by an iron core inductor. The design for the sensor 130 is well known in the art. The sensor 130 is powered by two lithium batteries 134. The trigger signal is powered by another battery assembly 136.

The two release pins 110 and 112 are moveably mounted to the support 100 such that outer ends 140 of the pins are extendable beyond the exterior side surfaces 106. This is to permit the outer ends 140 to extend into the holes 122 of the mounting members. When a magnetic field is sensed, the sensor sends the trigger signal to being activating the mechanism for retracting the pin ends 140. The trigger signal is an electrical current from the battery 136 to a titanium nickel wire 142. The current moving through the wire heats it up and causes it to contract, which is a property of this metal alloy. Other embodiments of the invention may use other resistive materials that contract upon heating. The contracting of the wire 142 moves a member 144 about a pivot point 146. As the member 144 pivots, a dog 148 disengages from a pivoting member 150. As a result, the member 150 pivots, thereby removing a dog 152 from the side of a pivoting member 154. The pivoting member 154 is rotatably mounted to the support 100.

The release pins 110 and 112 are connected to the pivoting member 154 via rigid linking members 156 such that when the pivoting member 154 pivots, the pins 110 and 112 extend beyond the exterior side surface 106 or retracts behind the surface. Springs 158 disposed about the release pins 110 and 112 and between the respective linking member 156 and the support sides 104 such that the springs urge the release pins to retract. This arrangement permits the release pins to retract when the dog 152 is removed from the side of the pivoting member 156.

To reset the release pins 110 and 112 in their extended position, the pivoting member 156 is rotated such that the release pins extend beyond the exterior side surfaces 106 and the dog 152 is reengaged with the side of the pivoting member 156. This is done by engaging a tool with interlocking members 160 and rotating the pivoting member. An electrical current is sent from the interlocking members 160 to a solenoid 162 to retract the solenoid and reset the dog 152 in the pivoting member.

Figure 8:
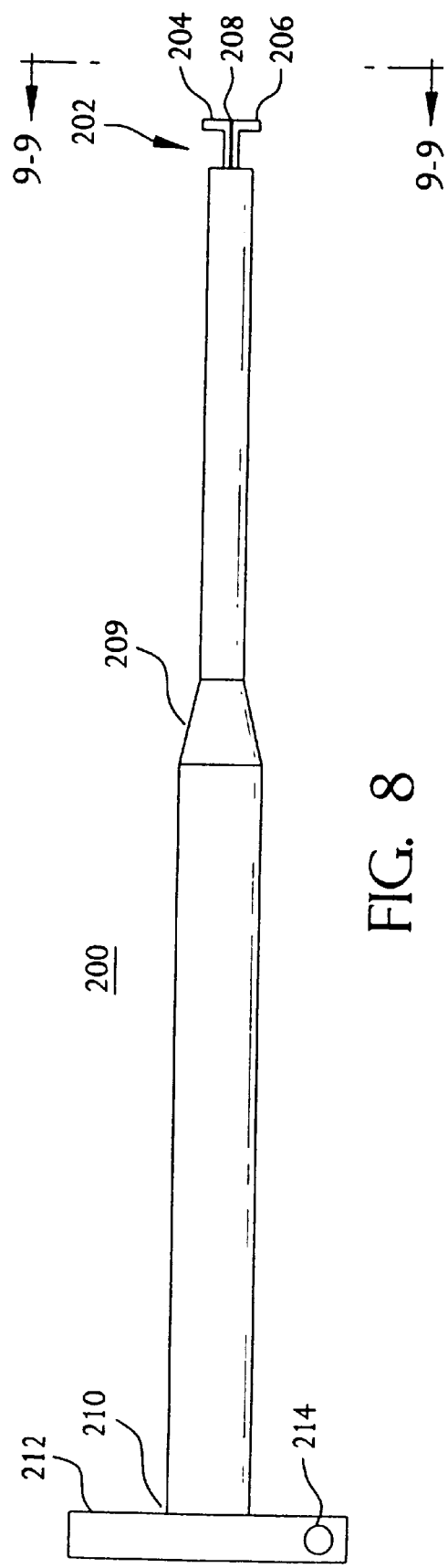
FIGS. 8–9 show a tool used to reset a triggered collapsible front suspension of FIGS. 5–7.
Figure 9:
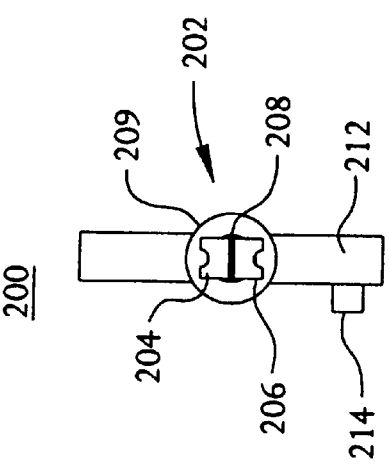

Referring to FIGS. 8 and 9, a tool 200 is used to rotate the pivoting member 156. The tool 200 comprises a first end 202 that complements the interlocking members 160 of the pivoting member 156. The first end 202 is comprised of two parts 204 and 206. An electrical insulation material 208 is disposed between the two parts 204 and 206. A body 208 extends from the first end 202. A power source (not shown) is in the body 208 and it is in electrical communication with the first end 202. At the second end 210 of the tool 200 is a handle 212 to facilitate turning the tool 200 once it is engaged with the interlocking members 160. A switch 214 is on the handle 212 is used to direct electrical power from the power source and to the first part 204 of the first end 202. Other embodiments of the invention may use other means for resetting the release pins 110 and 112 in the extended position, including having the tool 200 and the power source separate.

Figure 10:
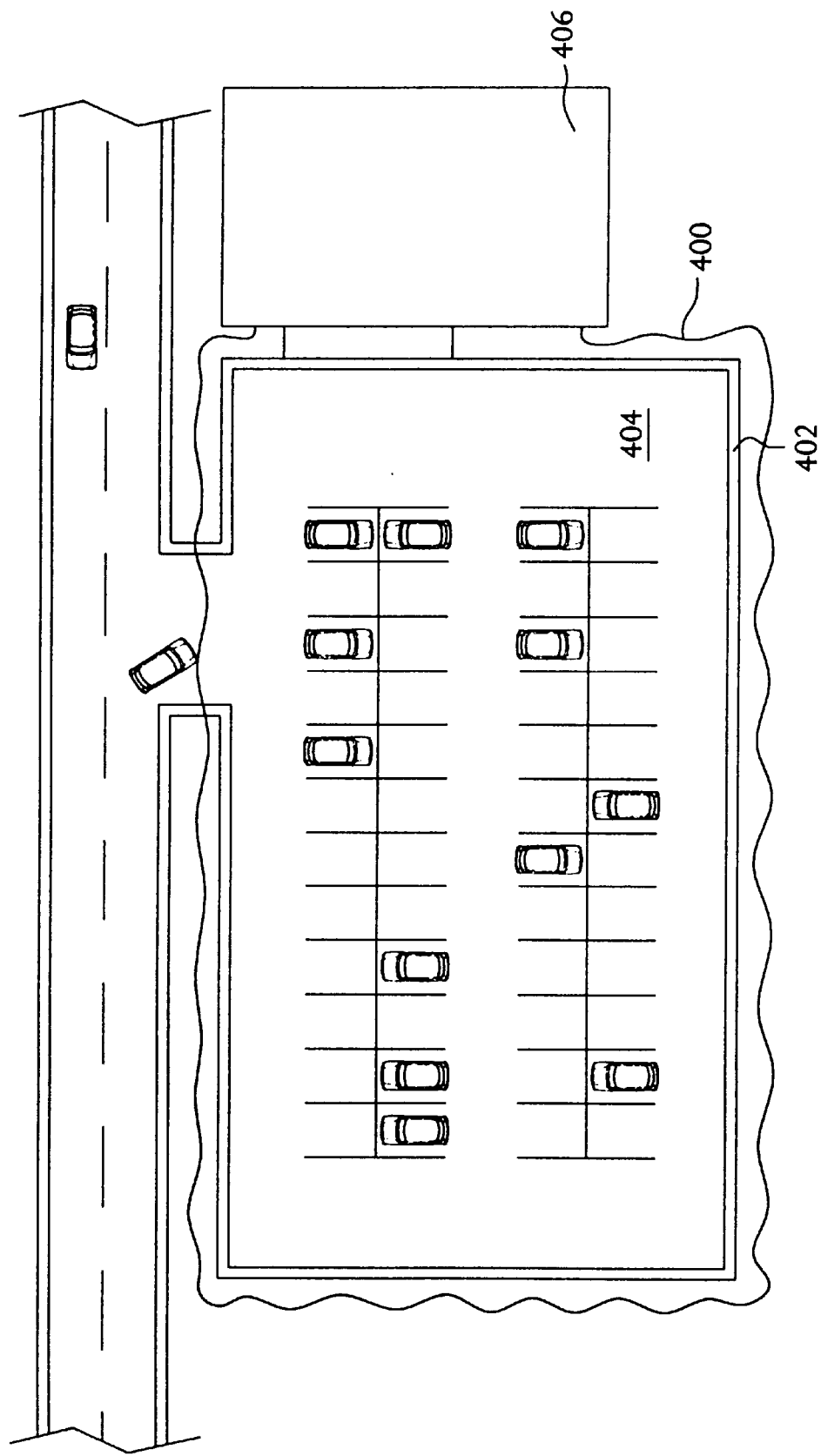
FIG. 10 shows a plan view of a parking lot generating a magnetic field there around according to an embodiment of the invention.

Referring now to FIG. 10, a magnetic field is generated by an electrical current flowing through a wire 400 that surrounds the perimeter 402 of an area 404. In FIG. 10, the area 404 is a parking lot for a supermarket 406. The invention is not limited to parking lots or supermarkets, and embodiments of the invention may have other perimeters for generating the magnetic field. Once the shopping cart 10 reaches the magnetic field, the front suspension 24 collapses, thereby disabling the shopping cart.

The present invention may be embodied in other specific forms without departing from the spirit or essential attributes. For example, the collapsible front suspension may be retrofited onto exiting shopping carts according to an embodiment of the invention. Additionally, an audio frequency may be used to trigger the collapsible front suspension instead of the mangnetic frequency. Accordingly, reference should be made to the appended claims, rather than to the foregoing specification, as indicating the scope of the invention.

We claim:

1. An anti-theft system for a shopping cart comprising:
   a collapsible front suspension mounted between the front side members of a base frame of the shopping cart;
   wherein said collapsible front suspension comprising:
   a. a support having two opposing sides with surfaces;
   b. a sensor comprising means for transmitting a trigger signal when a magnetic field or an audio frequency is detected;
   c. two release pins moveably mounted to the support, the release pins comprising an outer end being extendable beyond the side surfaces, respectively;
   d. an activation mechanism designed and arranged to retract the release pins upon receipt of the trigger signal such that the release pin outer ends are not extending beyond the respective side surfaces in order to cause the suspension to collapse for inhibiting the shopping cart from being pushed forward;

e. two linearly aligned hinge pins extending past the side surfaces, respectively.

2. The anti-theft system of claim 1, wherein the suspension further comprising a release pin movement assembly comprising:

a. a pivoting member rotatably mounted to the support; and b. rigid linking members extending from the pivoting member to an inner end of the release pins, respectively, the release pin movement assembly arranged such that rotating the pivoting member to a first position extends the release pins beyond the side surfaces, respectively, and rotating the pivoting member to a second position retracts the release pins such that the release pins are not extending beyond the side surfaces, respectively.

3. The anti-theft system of claim 2, wherein:

a. the release pin movement assembly further comprises a holding mechanism adapted to lock the pivoting member in a first position such that the release pins extend beyond the side surfaces of the support; and b. the activation mechanism comprises:
 i. a trigger wire comprising a metal that contracts when heated through electrical resistance, the trigger wire being attached to the holding mechanism and the structure such that contraction of the trigger wire results in the holding mechanism unlocking the pivoting member; and
 ii. springs disposed about the release pins and between the linking member and the support sides such that the springs urge the release pins to retract when the holding mechanism is not locking the pivoting member, resulting in the pivoting member rotating to a second position.

4. The anti-theft system of claim 3, wherein the trigger wire is comprised of titanium nickel.

5. The anti-theft system of claim 3, wherein said suspension further comprising:

a. interlocking members extending from a top surface of the pivoting member, wherein the interlocking members are engagable with a rotating tool, whereby when the rotating tool has turned the pivoting member from the second position to the first position, the pivoting member is locked in the first position by the holding mechanism.

6. The suspension of claim 1, further comprising two wheels mounted to an underside of the support.

7. The anti-theft system of claim 6, wherein said suspension further comprising two mounting members, wherein each mounting member comprises:

a. a face that complements a respective support side surface, wherein a first hole extending through the face is alignable with a respective release pin when a respective hinge pin is extending into a second hole extending through the face; and b. a mounting leg extending from the face.

8. The anti-theft system of claim 7, wherein:

the mounting members mounting legs are mounted to the side members, respectively such that the hinge pins extend into the respective second holes and the release pins are engageable with the respective first holes.

9. The anti-theft system of claim 8, further comprising a stop forward movement member of the base frame downwardly and is away from the support.

10. The anti-theft system of claim 9, wherein the stop forward movement dog is not centrally positioned on the base frame front member.

11. The anti-theft system of claim 1, further comprising:

the suspension is pivotally attached to the front side members of the base frame of the shopping cart via the hinge pins; and a first back wheel assembly non-rotatably mounted to the first back portion side of the base frame comprising a first back wheel mounted in a stop rolling dog, the first back wheel assembly arranged such that the first back wheel is inhibited from rolling when the first back wheel and a bottom edge of the stop dog is in contact with a surface; and a second wheel assembly rotatably mounted to the second back portion side of the base frame comprising a second wheel mounted in a wheel holder and a stop rotating dog extending from the shopping cart and comprising an end that prevents the wheel holder from rotating 360 degrees.

12. The anti-theft system of claim 11, the collapsible front suspension further comprising:

two mounting members, wherein each mounting member comprises:

a. a face that complements a respective support side surface, wherein a first hole extending through the face is alignable with a respective release pin when a respective hinge pin is extending into a second hole extending through the face; and b. a mounting leg extending from the face, wherein the mounting members mounting legs are attached to the front side members of the base frame, respectively such that the hinge pins extend into the respective second holes and the release pins are engageable with the respective first holes.

13. The anti-theft system of claim 1, wherein:

the suspension is pivotally attached to the front side members of the base frame of the shopping cart via the hinge pins; and b. a back wheel assembly non-rotatably mounted to the back portion side of the base frame of the shopping cart comprising a back wheel mounted in a stop rolling dog, the back wheel assembly arranged such that the back wheel is inhibited from rolling when the back wheel and a bottom edge of the stop dog is in contact with a surface.

14. The anti-system of claim 1, wherein:

the suspension is pivotally attached to the front side members of the base frame of the shopping cart via the hinge pins; and b. a wheel assembly rotatably mounted to the back portion side of the base frame of the shopping cart comprising a wheel mounted in a wheel holder and a stop rotating dog extending from the shopping cart and comprising an end that prevents the wheel holder from rotating 360 degrees.

15. A method of retrofitting a shopping cart with an anti-theft device comprising the steps of a. Pivotally mounting the collapsible front suspension between the front side members of the base frame of the shopping cart; wherein said suspension comprises:
 a) a support having two opposing sides with surfaces;
 b) a sensor;
 c) two release pins moveably mounted to the support, the release pins comprising an outer end being extendable beyond the side surfaces, respectively;

d) an activation mechanism;

e) two linearly aligned hinge pins extending past the side surface;

b. Mounting a front wheel assembly to the exterior of the suspension;

c. Transmitting a trigger signal when a magnetic field or an audio frequency is sensed by the sensor;

d. Retracting the release pins upon receipt of the trigger signal by the activation mechanism such that the release pin outer ends are not extending beyond the respective side surfaces in order to collapse the suspension along with the front wheel assembly for inhibiting the shopping cart from being pushed forward.

16. The method of claim 15, wherein the collapsible front suspension is pivotally mounted to the base frame via the hinge pins in step a; and the magnetic field or the audio frequency is generated along a perimeter of an area.

17. An anti-theft system for a shopping cart comprising:

a front wheel support assembly mounted on a base frame of the shopping cart, said assembly comprises:

a pair of front wheel coupled to the exterior of a collapsible housing;

wherein the collapsible housing enclosed a sensor and a trigger mechanism;

wherein said sensor is for sensing a magnetic field or an audio frequency and for generating a trigger signal; and said trigger mechanism adapted to collapse the support assembly from the base frame upon receipt of the trigger signal for inhibiting the shopping cart from being pushed forward; wherein said trigger mechanism comprises a contracting member that contracts upon heating.

18. The anti-theft system of claim 17, wherein the contracting member comprises a metal member that contracts upon heating through electrical resistance.

19. The anti-theft system of claim 18, wherein the metal member comprises titanium nickel.

20. The anti-theft system of claim 18, wherein the metal member comprises a titanium nickel wire.

* * * * *